Figure 1:
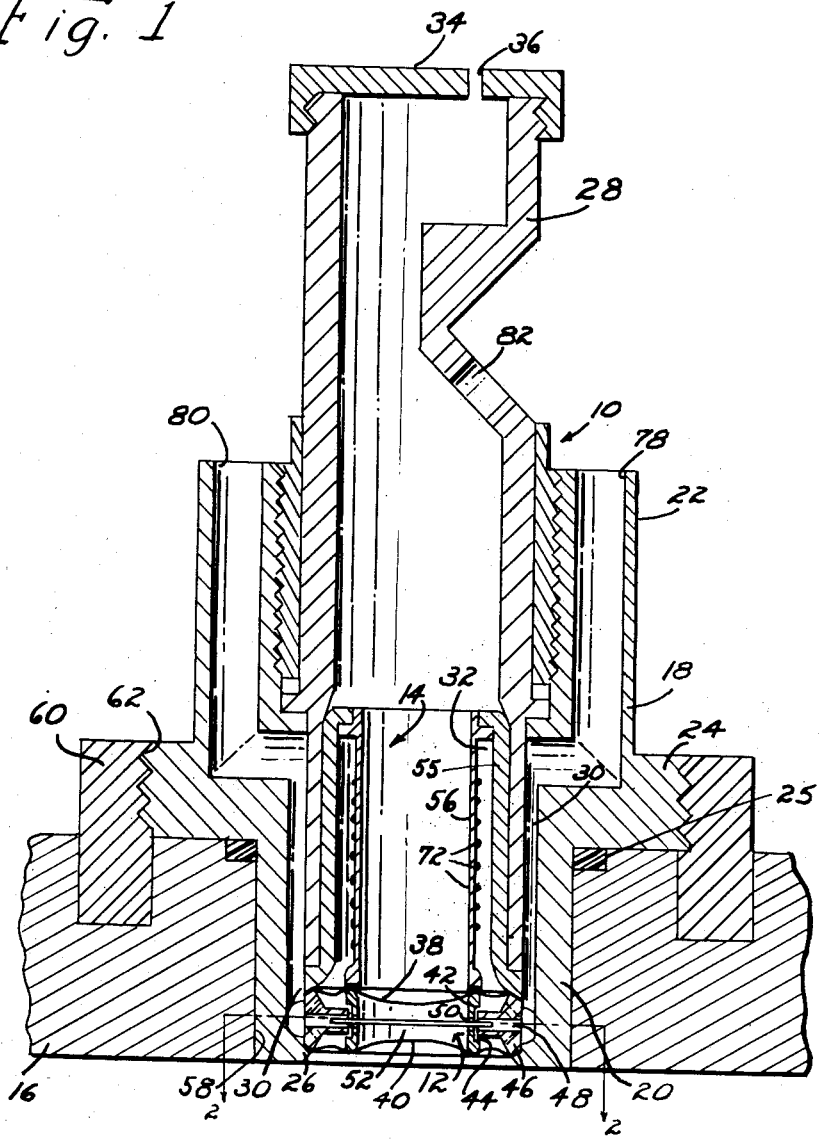

June 14, 1960

YAO T. LI 2,940,313

PRESSURE INDICATOR

Filed Feb. 27, 1956

2 Sheets-Sheet 1

INVENTOR.
Yao T. Li
BY
*his attorney*

June 14, 1960

YAO T. LI 2,940,313

PRESSURE INDICATOR

Filed Feb. 27, 1956

2 Sheets-Sheet 2

INVENTOR.
Yao T. Li
BY George L. Greenfield
his attorney

United States Patent Office 2,940,313
Patented June 14, 1960

2,940,313

PRESSURE INDICATOR

Yao T. Li, Lincoln, Mass.
(28 Orchard St., Watertown, Mass.)

Filed Feb. 27, 1956, Ser. No. 568,025

3 Claims. (Cl. 73—398)

This invention relates to pressure indicators and comprises a new and improved indicator, particularly suited for measuring pressure in the combustion chamber of a rocket motor.

The temperatures of gases within the combustion chamber of a rocket motor are extremely high and vary over a wide temperature range. Furthermore, these gases are highly turbulent and very often are extremely corrosive.

One important object of my invention is to provide a pressure indicator insensitive to the changes in temperature, the turbulence and the corrosive nature of the gases, and capable of accurately measuring static and dynamic pressures in the combustion chamber of a rocket motor. To accomplish this important object, the indicator must be capable of withstanding, over prolonged periods, exposure to high temperature and turbulent gases without burning out. Moreover, the differential expansion of the structural materials comprising the indicator must be held to a minimum so that the pressure sensing member within the instrument is not influenced by temperature gradients throughout the body.

In my prior application Serial No. 120,316, filed August 8, 1949, now Patent No. 2,627,749, which teaches the basic principles of a good pressure indicator design, I disclose the use of a strong, yet flexible catenary diaphragm supported by a strain tube. However, the single diaphragm in the original disclosure could not withstand the severe temperature conditions imposed upon it by a rocket motor. The static drift of the pressure signal is not tolerable in rocket engine research where accurate determination of the static pressure is as important as the measure of the amplitudes of oscillating pressures.

Another important object of my invention is to introduce the use of water as a cooling medium in conjunction with a catenary diaphragm so that the diaphragm may be exposed to severe temperature conditions. This must be accomplished without dynamic effect upon the diaphragm so that accurate pressure measurements are obtained from the instrument. The dynamic effect of water against a single diaphragm would adversely effect the response of the indicator, for the water would act as a damper to retard the response of the diaphragm to the pressure being measured. Furthermore, unless the pressure head of the water used as a cooling medium was maintained constant, errors would appear in the pressure measurements.

Because highly corrosive gases, such as fuming nitride acid, are frequently used as fuel in rocket engines, the conventional means of securing diaphragms to the main body, such as silver solder and brazing joints are impractical. A firm mechanical clamping which will not become loose in service under mechanical strain and temperature changes is indispensable.

Still another important object of my invention is to provide an indicator capable of measuring the differential of pressures, one applied externally and the other applied internally of the instrument, while cooling water at some independent pressure is flowing behind the diaphragm receiving the externally applied pressure.

To accomplish these and other objects, my pressure indicator includes a body carrying at one end, a pair of spaced apart diaphragms separated by a force transmitting ring. A constant reference pressure is applied to one of the diaphragms while the pressure to be measured is directed against the other diaphragm in the opposite directions. A strain tube coaxial with and abutting against the end of the transmitting tube or ring is fixed at one end and receives the differential of the pressures applied to the diaphragms. The deflections of the tube, resulting from the differential pressure applied against it, are converted to electrical signals by a strain gage transducer.

A pair of passages formed in the body of the indicator direct water between the two diaphragms to cool the assembly. The lower portion of the body which extends into the wall of the combustion chamber is free of threads as conventionally used for installing the indicator to the combustion chamber. This portion of the body which is adjacent the diaphragms and surrounds a portion of the strain tube, therefore, has a minimum area of contact with the walls of the combustion chamber. Thus, heat transfer through the lower portion of the body from the wall of the combustion chamber is held to a minimum. At the same time, the water directed through the assembly cools the diaphragms and the strain tube.

Figure 4:
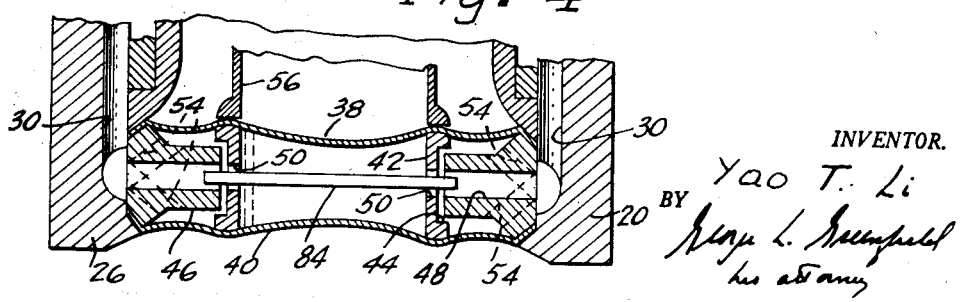
Figure 2:
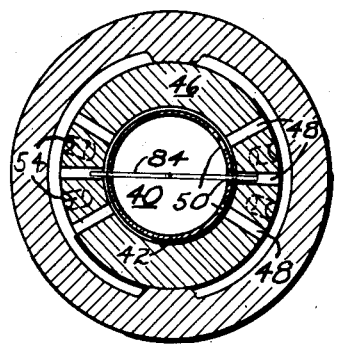
Figure 3:
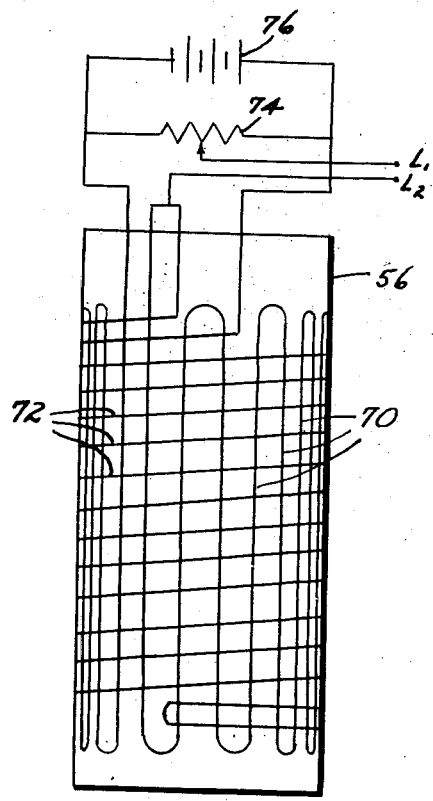

These and other objects and features of my invention, along with incident advantages, will be better understood and appreciated from the following detailed description of one embodiment thereof, selected for purposes of illustration and shown in the accompanying drawing in which:

Figure 1 is a cross-sectional elevation view of a pressure indicator constructed in accordance with my invention, Figure 2 is a cross-sectional view of a portion of the indicator shown in Figure 1 and taken along the corresponding section line in that figure, Figure 3 is an elevation view of a portion of the indicator shown in Figure 1 and includes strain gage windings and a measuring circuit, and Figure 4 is an enlarged fragmentary view of a portion of the indicator shown in Figure 1.

The embodiment of my invention shown in the drawing includes in its general organization a body subassembly 10, a diaphragm subassembly 12 and a strain tube subassembly 14. The indicator is shown mounted on a wall 16 of a combustion chamber.

The body assembly 10 is made up of a frame 18 having a lower cylindrical portion 20 and an upper portion 22 cylindrical in shape and somewhat larger than the lower portion 20. A shoulder or waist 24 separates the upper and lower cylindrical portions of the frame 18 and rests on the outer surface of the wall 16 of the combustion chamber.

A gasket 25 made of neoprene or other material and capable of withstanding high temperature without ill-effect is disposed at the junction of the lower surface of the waist 24, the upper surface of the wall 16 and the lower cylindrical portion 20 of the frame.

The lower end of the cylindrical portion 20 carries a flange 26 whose function will be described in connection with the diaphragm assembly 12.

Extending downwardly through the frame 18 is a cylindrical-shaped member 28 which terminates above the flange 26. The lower portion of the member 28 separates a pair of longitudinal passages 30 from an inner cylindrical cavity 32 within the frame. A cap 34 having a single small opening 36 through it screws onto the top of the cylindrical-shaped member 28.

The diaphragm assembly 12 includes two thin catenary diaphragms 38 and 40 which are clamped in the body assembly 10. A force transmitting ring 42 separates the diaphragms and has a recess 44 in its outer surface to provide a limited clearance between it and a disc 46.

A number of horizontal passages 48 in the disc 46 are axially aligned with passages 50 in the force transmitting ring 42. These passages communicate with the passages 30 in the frame 18 and together direct fluid in and out of the chamber 52 between the diaphragms. A number of other passages 54 communicate with the passages 30 and extend both upwardly and downwardly from adjacent the periphery of the ring 46 to direct cooling water against the diaphragms outside the force transmitting ring 42. Thus, the entire inner surfaces of the diaphragms 38 and 40 are in constant contact with the cooling medium which is fed through the assembly by the passages 30. The lower diaphragm 40 rests on the flange 26 of the frame 18 and is held in place by the disc 46 which is secured in the position illustrated by the lower flange of a sleeve 55, while the periphery of the upper diaphragm 38 is disposed between the lower flanges of the sleeve 55 and the disc 46. Thus, a firm mechanical clamp is provided for the diaphragms.

A strain tube 56 forming part of the strain tube subassembly 14 is anchored at one end to the upper end of the sleeve 55, while the lower end of the strain tube abuts against the diaphragm 38 in turn supported by the force transmitting ring 42. In order that the pressure indicator be capable of measuring pressure fluctuations of extremely small magnitudes, it is necessary that the strain tube 56 have a rather low strength. Thus, as suggested in Figure 1, the tube 56 has an extremely thin cylindrical wall.

The pressure indicator assembly extends through an opening 58 in the wall 16 of the combustion chamber. A ring 60 anchored in the wall 16 surrounds the opening 58 and is internally threaded as is shown at 62 to receive similar threads on the shoulder or waist 24 of the frame 18. The absence of threads on the lower cylindrical portion 20 of the frame 18 is an extremely important feature and requires some elucidation. First of all, by eliminating threads on the cylindrical portion 20 and instead using the ring 60 as a means for mounting the indicator, a minimum area of contact exists between the cylindrical portion 20 of the frame and the wall 16. Therefore, heat transfer between these elements, which is a function of the area, is substantially reduced. As a result, the frame 18 experiences considerably less thermal expansion. Furthermore, the elimination of threads on the cylindrical portion 20 of the frame 18 substantially eliminates mechanical stresses on the body. These facts insure tight fit between the disc 46 and the flange 26 which bear against the periphery of the lower catenary diaphragm 40. Thus, a virtual seal exists about the bottom of the indicator, and the hot gases in the combustion chamber can not enter the internal portions of the indicator.

Although I have illustrated but a single means for retaining the indicator in the opening 58 to avoid mechanical stress on the body and maintain a minimum of heat transfer from the combustion chamber wall 16 to the indicator, other similar means may be employed to accomplish the same function. For example, instead of providing mating threaded sections on the waist 24 and the ring 60, a clamp, removably secured to the ring and engaging the waist 24, could be provided for the same purpose. Alternatively, the waist 24 could be bolted directly to the wall 16 and the ring 60 eliminated. Just so long as the mechanical stresses and excessive heat transfer are avoided, as taught in the foregoing disclosure, the specific means chosen to retain the indicator in the wall will be acceptable.

Turning now to the means provided for measuring the distortion of the strain tube 56 and referring to Figure 3, a number of longitudinal strain receiver windings 70 are bonded to the strain tube 56. In addition, a number of circumferential turns of strain receiving windings 72 are wound about the tube 56. While the windings 70 respond to the compressive stress in the tube caused by the pressure loading, the windings 72 respond to the tensile stress which is proportional to the product of the compressive stress and Poisson's ratio. The windings 70 and 72 are connected in a bridge circuit so that the bridge output represents the sum of the longitudinal and lateral strain. This bridge circuit is completed by a balancing bridge resistor 74 and a power source 76. The output signal is measured across L1 and L2, L1 being connected to the center tap of the balancing bridge resistor 74, while L2 is connected to the junction between the longitudinal and circumferential windings.

Having described in detail the various elements which make up the pressure indicator illustrated in the drawing, its operation will now be described. To measure the pressure in the combustion chamber, the indicator assembly is inserted into the opening 58 in the combustion chamber wall 16. The assembly is held in place by virtue of the registration of the threads on the waist or shoulder 24 and the threads 62 on the ring 60 which surround the opening 58. It will be noted from an inspection of Figure 1 that the lower diaphragm 40 of the assembly is directly exposed to the pressure within the combustion chamber. Water inlet and outlet passages (not shown) are then connected respectively to passages 78 and 80 formed in the frame 18 and which communicate with the passages 30. A balancing or reference pressure is exerted against the upper diaphragm 38 by connecting a pressure source (not shown) to the opening 82 in the member 28. If the indicator is to be used to measure pressure fluctuations of small magnitude which are superimposed upon a large static pressure, it may be desired to adjust the reference or balancing pressure exerted on the upper diaphragm 38 so that it equals the static pressure. The strain gage windings 70 and 72 wound upon the strain tube 56 respond to longitudinal compression and a circumferential expansion of the tube when the pressure exerted against the diaphragm 40 exceeds the reference pressure exerted against the diaphragm 38. This distortion of the strain tube is caused by the axial movement of the force transmitting ring 42 against the lower end of the tube. The limited clearance which exists between the groove 44 on the ring 42 and the disc 46 permits the ring to move a few thousandths of an inch. Beyond that, its motion is limited by the shoulders of the disc which bear against the recess 44. This serves as a limit stop, preventing diaphragm or strain tube failure when either the balancing pressure or the measured pressure are accidentally interrupted. The opening 36 in the cap 34 permits the leads from the strain gage windings 70 and 72 to extend out of the indicator and permits the output signal to be measured at any remote location.

It will be noted in Figures 1 and 2 that a pin 84 extends across the cavity 52 between the diaphragms and terminates in the passages 48 in the disc 46. The pin insures continued alignment of the passages 48 and 50 in the disc 46 and ring 42, respectively. In its absence, chattering of the indicator could cause relative movement of the ring and disc to interrupt the registration of these passages. Chattering constitutes a real problem because pressure fluctuation may occur within a frequency range between 100 and 2,000 cycles per second.

From the foregoing description of one embodiment of my invention, those skilled in the art will appreciate that numerous modifications may be made of the invention without departing from the spirit thereof. Therefore, it is not my intention to limit the scope of my invention to the single embodiment illustrated and described, but rather it is intended that the breadth of my invention be determined by the appended claims and their equivalents.

What I claim as new and desire to secure by Letters Patent of the United States is:

1. A pressure indicator comprising a frame having a smooth outer cylindrical wall and an inner cylindrical chamber, an annular flange formed in the frame extending into the bottom of the chamber, a first diaphragm having its periphery seated on the flange, an annular disc bearing against the periphery of the diaphragm for holding it in place, a sleeve within the chamber bearing against the disc, a second diaphragm having its periphery disposed between the sleeve and the disc, a movable force transmitting ring coaxial with the disc and disposed between the diaphragms, a strain tube fixed at one end to the sleeve and having its other end abutting against said second diaphragm opposite said ring, means for measuring distortion of the tube in response to axial movement of the ring, there being a number of passages formed in the disc and the ring for directing fluid between the diaphragms within the ring, means for maintaining alignment of the passages in the ring and the disc, means directing fluid between the diaphragms outside the ring, and means connected to the frame for holding the smooth cylindrical wall in an opening in a wall of a chamber whose pressure is to be measured.

2. A pressure indicator comprising a frame which includes a lower cylindrical portion having a smooth outer surface, a diaphragm assembly including a pair of diaphragms separated by a movable force transmitting ring and disposed in the lower end of the cylindrical portion, a disc concentric with the ring and bearing against the peripheral portions of the diaphragms for holding them in place, means for limiting the movement of the ring relative to the disc, means for directing a reference pressure against one of the diaphragms, means for exposing the other of the diaphragms to the pressure to be measured, a strain tube having one end secured to the frame and its other end abutting against the diaphragm opposite the ring, means for measuring the distortions of the tube resulting from movements of the ring when unequal pressures are applied against the diaphragms, there being passages formed in the ring and the disc for directing fluid between the diaphragms within the ring, means for maintaining alignment of the passages in the ring and the disc, means for directing fluid between the diaphragms outside the ring, and means for securing the smooth cylindrical surface of the frame in an opening in a wall of a chamber whose pressure is to be measured.

3. In combination with a chamber having a wall with an opening therein, said opening providing access to the chamber whereby the interior chamber pressure may be measured, a pressure indicator comprising a frame, a cylindrical portion formed at one end of the frame and having a smooth outer surface inserted into the opening, an outwardly extending flange formed on the frame immediately adjacent the smooth outer surface providing a stop against the outer surface of the wall of the chamber when the cylindrical portion is inserted into the opening in the wall, means secured to the chamber wall and engaging said flange for retaining the frame on the wall with the cylindrical portion in the opening a pressure sensing device including a pair of diaphragms extending across the end of the frame in the cylindrical portion and having their edges secured to the frame, a force transmitting ring disposed between and engaging the diaphragms, an annular disc between the diaphragms and surrounding the ring and securing the periphery of the diaphragms to the frame, means forming passages through the ring and disc for carrying a cooling liquid between the diaphragms, means for maintaining the passages in the ring and disc in alignment, a strain tube abutting against the inner of the diaphragms opposite the force transmitting ring and secured to the frame, and electrical means secured to the strain tube for measuring distortions of the tube.

References Cited in the file of this patent

UNITED STATES PATENTS

| 2,248,301 | Krause | July 8, 1940 |
| 2,429,248 | Volsk | Oct. 21, 1947 |
| 2,509,421 | Carter | May 30, 1950 |
| 2,627,749 | Li | Feb. 10, 1953 |
| 2,637,210 | Hathaway | May 5, 1953 |
| 2,656,444 | Du Bois | Oct. 20, 1953 |
| 2,729,730 | Brady | Jan. 3, 1956 |
| 2,741,128 | Gadd et al. | Apr. 10, 1956 |

FOREIGN PATENTS

| 311,436 | Germany | Mar. 31, 1919 |